Sept. 5, 1933.   J. A. WINGER   1,925,126
MOTOR VEHICLE
Filed Feb. 24, 1931
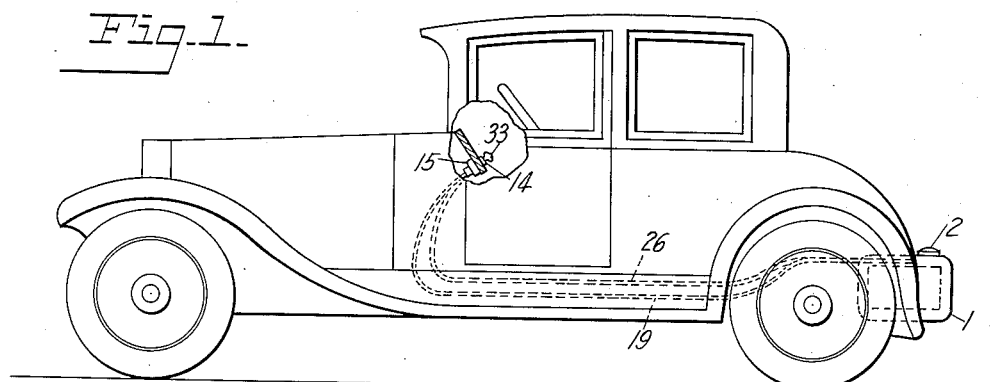
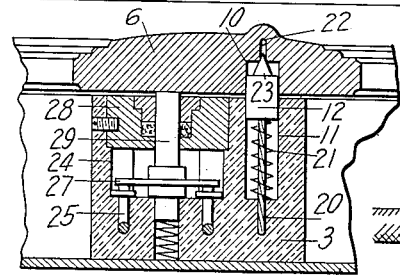
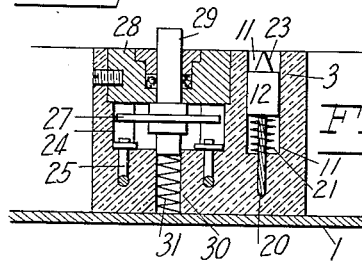
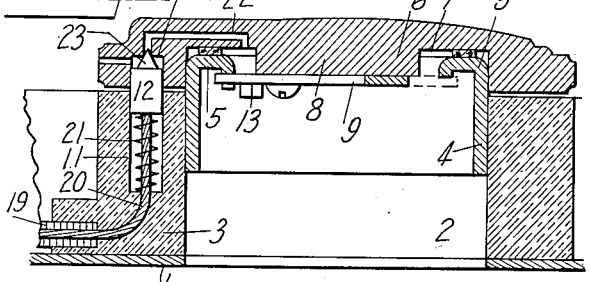
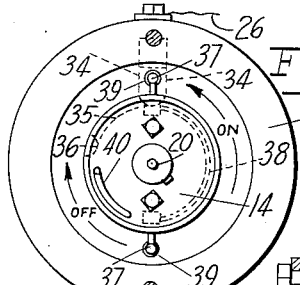
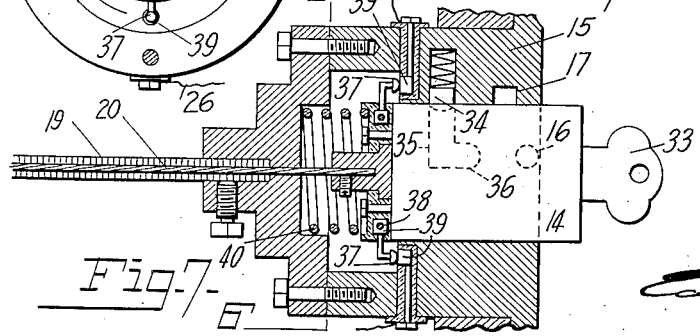
INVENTOR.
JOSEPH A. WINGER.
by
his ATTORNEY.

Patented Sept. 5, 1933

1,925,126

UNITED STATES PATENT OFFICE 1,925,126

MOTOR VEHICLE

Joseph A. Winger, Lawrenceville, Ill.

Application February 24, 1931. Serial No. 517,717

5 Claims. (Cl. 123—146.5)

This invention relates to motor vehicles and more particularly to means for locking the cap on the fuel tank and for utilizing the cap and its locking means to control the operation of the engine.

One object of the invention is to provide means for locking the cap on the fuel tank when the ignition switch on the instrument board is open.

A further object of the invention is to provide means to break the ignition circuit when the cap is removed from the fuel tank and to prevent the engine being started until the cap is replaced.

A further object of the invention is to provide means to prevent the continued operation of the engine in the event the ignition switch at the instrument board is short circuited while in its open position.

Other objects of the invention will appear as the mechanism is described in detail.

In the accompanying drawing Fig. 1 is a side elevation of an automobile, partly broken away, showing my invention applied thereto; Fig. 2 is a top plan view of the cap for the fuel tank, partly broken away; Fig. 3 is a section taken on the line 3—3 of Fig. 2; Fig. 4 is a section taken on the line 4—4 of Fig. 2, with the cap in its closed position; Fig. 5 is a section similar to Fig. 4 with the cap removed; Fig. 6 is an end view of the ignition switch on the instrument board; and Fig. 7 is a sectional view of the ignition switch and lock.

In this drawing I have illustrated one embodiment of my invention but it will be understood that this particular embodiment has been chosen for the purposes of illustration only and that the apparatus may take various forms without departing from the spirit of the invention.

In that embodiment here illustrated the automobile is provided with the usual fuel tank 1, which is here shown as mounted at the rear end of the automobile. This tank has a filling opening 2 surrounded by a boss 3 and mounted within this boss is a collar 4 the upper portion of which projects above the boss and is provided with inwardly turned segmental portions 5 forming flanges. The closure or cap 6 is provided with a recess 7 to receive the upper portion of the collar 4, about which the cap fits snugly. The cap is also provided with a depending intermediate portion 8 to which is secured a bar 9 so arranged that when the cap is placed on the boss 3 the end portions of the bar will enter between the flanges 5 and when rotatory movement is imparted to the cap these end portions of the bar will engage beneath the flanges 5 to secure the cap in position to close the opening. In order to lock the cap in its closed position I have provided the same, in the lower surface thereof and above the boss 3, with a locking recess 10. The boss 3 has formed therein a recess or vertical guideway 11 in which is slidably mounted a locking member or plunger 12. The recesses 10 and 11 are so mounted that they will be in vertical alinement when the cap is in its closed position, a stop 13 being preferably provided to limit the rotatory movement of the cap. The recess or guideway 11 is of such depth that the plunger may be drawn into the same and thus entirely withdrawn from the locking recess 10 in the cap. The position of the locking plunger 12 is controlled by the ignition switch on the instrument board which as usual is provided with a lock for retaining the same in its open position and thus preventing the unauthorized operation of the automobile. The ignition switch and its lock may be of any suitable character, it being only necessary that the switch be provided with an operating member which can be locked in a position to hold the switch open. In the present drawing I have shown this operating member as a plunger 14 slidably mounted in the casing 15 on the instrument board of the automobile. The plunger constitutes a locking member and is provided with one or more bolts 16 adapted to enter locking recesses in the casing 15 when the plunger is in its innermost position, in which position the ignition circuit will be open. The bolt 16 may be controlled by a key 33 in any suitable manner but inasmuch as the bolt operating mechanism forms no part of the present invention it is not here shown. The plunger 14 has both sliding and rotatory movement in the casing and is guided in these movements by a spring pressed guide pin or detent 34 which extends into a peripheral groove in the plunger. This groove comprises a circumferential portion 35 and a longitudinal portion 36. Secured to the inner end of the plunger are contact members 37 which are connected one to the other by a conductor 38. As here shown, these contact members are arranged on opposite sides of the plunger and are adapted to be moved by the rotation of the plunger into engagement with stationary contact members 39 on the adjacent surface of the casing 15, these contact members 39 being insulated from the casing and being connected with the respective sides of the ignition circuit. A spring 40 tends to move the plunger 14 outwardly when it is unlocked and to press the contacts 37 toward the face of the casing. In Fig. 7 the plunger is shown in its unlocked position with the circuit closed and the guide pin 34 is in the circumferential portion 35 of the groove. To break the circuit a partial rotation is imparted to the plunger by means of the key 33. If the ignition switch is to be locked open the plunger is rotated until the longitudinal part 36 of the groove is brought into line with the guide pin and the plunger is then pressed inwardly against the action of the spring 40 and the key actuated to set the bolt 16. The key is preferably of such a character that it cannot be removed until the bolt 16 is set. When the ignition circuit is to be closed the key 33 is first operated to retract the bolt 16, thus releasing the plunger and permitting it to be moved outwardly by the spring 40, thereby bringing the contacts 37 into engagement with the insulated face of the casing. The plunger is then rotated to bring the contacts 37 into engagement with the contacts 39, thus closing the ignition circuit.

The operating member 14 for the ignition switch is so connected with the locking member 12 for the cap 6 that when the operating member is in a position to open the switch the plunger 12 will be projected above the boss 3 and, if the closure is in position on the boss, will extend into the locking recess 10 and thereby hold the cap or closure against rotatory movement to release the retaining bar 9 from the flanges 5. The connection between the locking member and the switch operating member may take various forms but it is here shown as comprising a Bowden wire and includes a flexible sheath 19 anchored at one end on the instrument board and at the other end on the boss 3, and a flexible operating wire 20 extending through the sheath and connected at one end with the switch operating member 14 and at its other end with the plunger 12. When the switch operating member is in a position to close the switch, as shown in Fig. 7, the plunger 12 will be retracted to the position shown in Fig. 5, thus releasing the cap. When the switch operating member is moved to a position to open the ignition switch the plunger 12 will be forced upwardly into the locking recess 10, as shown in Fig. 3. If desired, a spring 21 may be mounted within the recess 11 to assist in moving the plunger to its locking position.

Automobiles are sometimes stolen or operated by unauthorized persons by short circuiting the ignition switch on the instrument board and I have, in the present apparatus, provided means for preventing the engine being operated for any considerable period of time when the ignition switch is so short circuited. To accomplish this I have provided means for closing the vent for the fuel tank when the ignition switch is locked in its open position. With the vent closed only a limited amount of fuel can be withdrawn from the fuel tank and as a result the operation of the engine will be interrupted after a comparatively brief interval. In the present arrangement I have utilized the lock for the tank cap to control the vent. As here shown, the locking recess 10 in the fuel cap is connected with the interior of the tank by a passageway or vent 22 which opens into the upper end of the recess 10. This recess is in open communication with the atmosphere and, as here shown, a passageway 23 extends laterally from the locking recess 10 to the atmosphere. The locking plunger 12 has on its upper end a part 23 constituting a valve and adapted to enter the end of the vent 22 and close the same when the plunger is in its locking position. It will be apparent therefore that when the ignition switch is in its open position the vent for the fuel tank will be closed and when this switch is closed the cap will not only be unlocked but the vent will be open to permit the continued operation of the engine.

It is desirable that the engine should be stopped when the fuel tank is opened for the purpose of replenishing the same and I have also provided in the present apparatus means for automatically breaking the ignition circuit and thus stopping the engine when the closure is removed from the fuel tank. As here shown, the boss 3 is provided with a recess 24, preferably arranged adjacent to the locking plunger 12 and in this recess I have mounted a switch which is connected in the ignition circuit. As here shown, this switch comprises two fixed contact members 25 which are connected, respectively, with conductors 26 forming part of the ignition circuit which, in the present instance, leads forward to the instrument board. This switch also comprises a movable contact member 27 which is here shown in the form of a plate arranged to be moved into and out of engagement with the two fixed contact members and the position of this movable contact member is controlled by the cap or closure 6. In the present instance, the upper end of the recess 24 is closed by a plug 28 and a plunger 29 is slidably mounted in that plug and extends into a guideway 30 formed in the boss below the recess 24 and the movable contact member 27 is rigidly secured to this plunger. A spring 31 acts on the plunger to move the same upwardly and when the movement of the plunger is unrestricted it will cause the upper end of the plunger to be projected above the upper surface of the boss 3 and this movement of the plunger will carry the movable contact member out of engagement with the fixed contact members 25 and thus open the switch. The plunger 29 is so arranged that when the cap 6 is placed in position on the boss it will engage the end of the plunger and depress the same thus closing the switch, and will retain the switch in closed position so long as the cap is in its closed position. When the cap is removed the spring 31 will move the movable switch member and plunger upwardly to again open the switch. This supplemental switch serves not only to stop the engine whenever the fuel tank is opened but also makes it necessary to replace the fuel cap before the engine can be started, thus avoiding the possibility of driving away from the filling station without the cap having been replaced.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a motor vehicle having a fuel tank, a removable closure therefor and an ignition circuit, a circuit breaker and closer arranged adjacent to said fuel tank and connected in said ignition circuit, and means controlled by said closure to cause said circuit breaker and closer to break said circuit when said closure is removed from said tank.

2. In a motor vehicle having a fuel tank, a removable closure therefor and an ignition circuit, a circuit breaker and closer arranged adjacent to said fuel tank, connected in said ignition circuit and comprising a movable contact member, means acting on said contact member to move the same to its open position, and a part connected with said contact member and arranged to be engaged by said closure when the latter is placed in its closed position and to hold said contact member in its closed position.

3. In a motor vehicle having a fuel tank, a removable closure therefor and an ignition circuit, a circuit breaker and closer arranged adjacent to said fuel tank, connected in said ignition circuit and comprising a movable contact member, a spring acting on said contact member to move the same to its open position, a part connected with said contact member and arranged to be actuated by said closure to move said contact member against the action of said spring to its closed position when said closure is placed in its operative position on said tank.

4. In a motor vehicle comprising a fuel tank having a filling opening and a closure therefor, and having a part adjacent to said opening provided with a recess, said motor vehicle also having an ignition circuit, a circuit breaker and closer mounted in said recess, connected with said ignition circuit and having a movable contact member, means acting on said contact member to move the same to its open position, and a device connected with said contact member and adapted to extend beyond said recess, said closure having a part to actuate said device to move said contact member to its closed position when said closure is placed in its operative position on said tank.

5. In a motor vehicle comprising a fuel tank having a filling opening and a boss extending about said opening, a closure to engage said boss and close said opening, and an ignition circuit, said boss having a recess therein, a circuit breaker and closer mounted in said recess, connected with said ignition circuit and having a movable contact member, a plunger connected with said movable contact member and arranged to be engaged by said closure and moved to a position to close said circuit when said closure is in its operative position, and a spring acting on said movable contact member to open said circuit and cause said plunger to project beyond said boss when said closure is removed.

JOSEPH A. WINGER.